United States Patent
O'Leary et al.

(10) Patent No.: US 11,378,757 B1
(45) Date of Patent: Jul. 5, 2022

(54) REDUCED SIZE OPTICAL CONNECTOR FOR MODULES AND CIRCUIT PACKS

(71) Applicant: Ciena Corporation, Hanover, MD (US)

(72) Inventors: Mitchell O'Leary, Ottawa (CA); Yannick Brisebois, Ottawa (CA); Victor Aldea, Ottawa (CA); Trevor Meunier, Kemptville (CA); Kamran Rahmani, Kanata (CA)

(73) Assignee: Ciena Corporation, Hanover, MD (US)

( * ) Notice: Subject to any disclaimer, the term of this patent is extended or adjusted under 35 U.S.C. 154(b) by 49 days.

(21) Appl. No.: 17/124,570

(22) Filed: Dec. 17, 2020

(51) Int. Cl.
*G02B 6/38* (2006.01)

(52) U.S. Cl.
CPC ......... *G02B 6/3846* (2013.01); *G02B 6/3821* (2013.01); *G02B 6/3869* (2013.01); *G02B 6/3898* (2013.01)

(58) Field of Classification Search
CPC ........ G02B 6/245; G02B 6/25; G02B 6/3636; G02B 6/3803; G02B 6/3809; G02B 6/3821; G02B 6/3849; G02B 6/3885; G02B 6/3893; G02B 6/3898
See application file for complete search history.

(56) References Cited

U.S. PATENT DOCUMENTS

| | | | |
|---|---|---|---|
| 6,577,804 B2 * | 6/2003 | Murakami | G02B 6/25 83/947 |
| 6,831,844 B1 | 12/2004 | Lee et al. | |
| 6,948,968 B1 | 9/2005 | Shearman et al. | |
| 7,194,179 B1 * | 3/2007 | Bryant | G02B 6/3843 385/134 |
| 7,391,951 B2 * | 6/2008 | Hayashi | G02B 6/25 385/136 |
| 7,669,744 B2 * | 3/2010 | Yazaki | G02B 6/25 83/13 |
| 8,442,375 B2 * | 5/2013 | Bylander | G02B 6/3833 385/137 |
| 8,746,525 B2 * | 6/2014 | Pepin | G02B 6/25 225/97 |
| 9,004,779 B2 * | 4/2015 | Horibe | G02B 6/3898 385/78 |
| 9,295,178 B1 | 3/2016 | Aldea et al. | |
| 9,748,747 B2 * | 8/2017 | Larson | H02G 1/1214 |
| 9,759,235 B2 | 9/2017 | Saturley et al. | |
| 10,028,407 B2 | 7/2018 | Meunier et al. | |
| 10,062,993 B1 | 8/2018 | Lutkiewicz et al. | |
| 10,070,553 B2 | 9/2018 | Lee et al. | |
| 10,509,180 B2 | 12/2019 | Meunier et al. | |

(Continued)

*Primary Examiner* — Ryan A Lepisto
*Assistant Examiner* — Erin D Chiem
(74) *Attorney, Agent, or Firm* — Clements Bernard Baratta; Lawrence A. Baratta, Jr.; Christopher L. Bernard

(57) ABSTRACT

An optical fiber connector of a networking module faceplate assembly includes a shuttle body, a connection assembly, and a retention clip. The shuttle body including a fiber slot extending across the shuttle body and adapted for an optical fiber to extend therethrough. The connection assembly is adapted to connect the optical fiber of the networking module to an external optical fiber connector. The connection assembly includes a ferrule flange fiber termination, a split sleeve, and a ferrule. The ferrule flange fiber termination positioned within the shuttle body and adapted to splice to an end of the optical fiber. A length of the optical fiber connector can be less than half a length of the external optical fiber connector.

20 Claims, 15 Drawing Sheets

(56) References Cited

U.S. PATENT DOCUMENTS

| | | |
|---|---|---|
| 10,638,631 B2 | 4/2020 | O'Leary et al. |
| 10,663,679 B2 * | 5/2020 | Sawicki ............... G02B 6/3849 |
| 10,782,492 B2 | 9/2020 | Meunier et al. |
| 2003/0185537 A1 | 10/2003 | O'Leary et al. |
| 2015/0117822 A1 * | 4/2015 | Hu ....................... G02B 6/3849 385/86 |
| 2015/0233388 A1 | 8/2015 | Saturley et al. |
| 2019/0269035 A1 | 8/2019 | Saturley et al. |
| 2020/0271878 A1 | 8/2020 | Maniloff et al. |
| 2020/0341218 A1 | 10/2020 | Leclair et al. |

* cited by examiner

REDUCED SIZE OPTICAL CONNECTOR FOR MODULES AND CIRCUIT PACKS

FIELD OF THE DISCLOSURE

The present disclosure generally relates to networking hardware. More particularly, the present disclosure relates to components of networking hardware and optical connectors for modules and circuit packs.

BACKGROUND OF THE DISCLOSURE

Networks, data centers, cloud computing, and the like continue to grow. Equipment manufacturers must continue to deliver substantial continuous reductions in per-bit metrics related to cost, space, and power. Networking modules, such as circuit packs and circuit board assemblies, for these networks, data centers, and cloud computing are getting increasingly smaller and more complex. This reduction in size and increased complexity results in a more densely packed module/circuit pack where space is at a premium, and room needed for heatsinks and other mechanical and optical components.

Current standard adapters for optical connections, such as duplex LC adapters are large (defined in IEC 61754-20, the contents of which are incorporated by reference), particularly the portion of the standard adapters within a module or circuit pack. Standard adapters for optical connections are typically used on the external part of the faceplate of the module/circuit pack, and while standard adapters are off the shelf parts that are easy to use and easy to add to an assembly, the space within the module or circuit pack required to plug optical connectors into the rear of the faceplate is a significant amount of physical volume within the module that could be used for other components, such as heatsinks and other mechanical and optical components. That is, a typical module/circuit pack will include optical connectors on the front of the faceplate for external connectivity as well as inside the module/circuit pack for internal connectivity. The two optical connectors mate to one another.

BRIEF SUMMARY OF THE DISCLOSURE

In one embodiment, an optical fiber connector of a networking module faceplate assembly is disclosed. The optical fiber connector includes a shuttle body, a connection assembly, and a retention clip. The shuttle body including a fiber slot extending across the shuttle body and adapted for an optical fiber to extend therethrough. The connection assembly is adapted to connect the optical fiber of the networking module to an external optical fiber connector. The connection assembly includes a ferrule flange fiber termination, a split sleeve, and a ferrule. The ferrule flange fiber termination positioned within the shuttle body and adapted to splice to an end of the optical fiber. The split sleeve adapted to optically connect the ferrule flange fiber termination to the external optical fiber connector. The ferrule adapted to collinearly align the external optical fiber connector, the split sleeve, and the ferrule flange fiber termination. The retention clip adapted to secure the connection assembly in place relative to the shuttle body.

In embodiments, the shuttle body includes a bore aligned with the fiber slot with an end thereof at least partially overlapped with the fiber slot and adapted to at least partially receive the ferrule flange fiber termination therein, such that the optical fiber spliced thereto extends from the ferrule flange fiber termination into the fiber slot. Optionally, the shuttle body includes a counterbore concentric to the bore and the ferrule includes a flange adapted to be received into the counterbore. Optionally, the retention clip includes a retention portion that overlaps with the flanged portion of the ferrule to secure the flanged portion within the counterbore.

In embodiments, the optical fiber connector further includes one or more retention features including at least one of a threaded fastener adapted to extend through the shuttle body, a magnet adapted to mate with a magnet in a faceplate of the faceplate assembly, a guide pin adapted to align the shuttle body with the faceplate, and a snap feature adapted to mate with a snap hole formed in the faceplate.

In embodiments, the shuttle body includes a guidance feature protruding from a top thereof, the guidance feature adapted to mate with a retention slot formed in a faceplate of the faceplate assembly. Optionally, the guidance feature includes a 'T' shape, the 'T' shape including a neck adapted to slide between recessed shelves of the faceplate and shoulders adapted to laterally overlap with the recessed shelves.

In another embodiment, a faceplate assembly for a networking module is disclosed. The faceplate assembly includes a faceplate and an external optical fiber connector. The optical fiber connector includes a shuttle body, a connection assembly, and a retention clip. The shuttle body including a fiber slot extending across the shuttle body and adapted for an optical fiber to extend therethrough. The connection assembly is adapted to connect the optical fiber of the networking module to an external optical fiber connector. The connection assembly includes a ferrule flange fiber termination, a split sleeve, and a ferrule. The ferrule flange fiber termination positioned within the shuttle body and adapted to splice to an end of the optical fiber. The split sleeve adapted to optically connect the ferrule flange fiber termination to the optical fiber connector. The ferrule adapted to collinearly align the optical fiber connector, the split sleeve, and the ferrule flange fiber termination. The retention clip adapted to secure the connection assembly in place relative to the shuttle body.

In embodiments, the shuttle body includes a bore aligned with the fiber slot with an end thereof at least partially overlapped with the fiber slot and adapted to at least partially receive the ferrule flange fiber termination therein, such that the optical fiber spliced thereto extends from the ferrule flange fiber termination into the fiber slot. Optionally, the shuttle body includes a counterbore concentric to the bore and the ferrule includes a flange adapted to be received into the counterbore. Optionally, the retention clip includes a retention portion that overlaps with the flanged portion of the ferrule to secure the flanged portion within the counterbore.

In embodiments, the faceplate assembly further includes one or more retention features including at least one of a threaded fastener adapted to extend through the shuttle body, a pair of magnets including one magnet in the shuttle body and one magnet in the faceplate adapted to hold the shuttle body in contact with the faceplate, a guide pin adapted to align the shuttle body with the faceplate, and a snap mechanism including a snap hole formed in the faceplate and a snap feature that protrudes from a surface of the shuttle body and is adapted to mate with the snap hole.

In embodiments, the faceplate includes a retention slot and the optical fiber connector includes a guidance feature protruding from a top thereof, the guidance feature adapted to mate with a retention slot formed in a faceplate of the faceplate assembly. Optionally, the faceplate includes recessed shelves along the retention slot and the guidance feature includes a 'T' shape, the 'T' shape including a neck adapted to slide between the recessed shelves and shoulders adapted to laterally overlap with the recessed shelves.

In a further embodiment, a networking module is disclosed. The networking module includes a Printed Circuit Board (PCB), a faceplate connected to the PCB, and an optical fiber connector. The optical fiber connector includes an optical fiber connected to the PCB, a shuttle body, a connection assembly, and a retention clip. The shuttle body includes a fiber slot extending across the shuttle body with the optical fiber extending therethrough. The connection assembly is adapted to connect the optical fiber to an external optical fiber connector. The connection assembly includes a ferrule flange fiber termination positioned within the shuttle body spliced to an end of the optical fiber, a split sleeve adapted to optically connect the ferrule flange fiber termination to the optical fiber connector, and a ferrule adapted to collinearly align the optical fiber connector, the split sleeve, and the ferrule flange fiber termination. The retention clip secures the connection assembly in place relative to the shuttle body.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

In various embodiments, the present disclosure relates to systems and methods for components of networking hardware and optical connectors for modules and circuit packs. In particular, the present disclosure relates to a faceplate assembly for networking modules that can be referred to as a Shuttle Pluggable Optical Connector (SPOC) 11. The SPOC 11 includes a smaller form factor than a standard optical connector, such as duplex LC adapter. The SPOC 11 is meant to be used internally in a module/circuit pack and less than have the size, in length of a duplex LC adapter. The length of the SPOC 11 is shorter than standard optical connectors, reducing the volume within the networking module used for optical connection, which allows the volume previously used for optical connection to be used for other components, such as heat sinks and other critical components. With this space free for these other critical components, improved efficiency in the module can be obtained as the extra space allows for improved designs within the same volume of the network module.

In some embodiments, a shuttle body of the SPOC includes a retention clip that is adapted to hold a connection assembly of the SPOC together. With the retention clip, the SPOC can be assembled prior to assembly of the SPOC with the faceplate, which can simplify the assembly process.

Figure 1:
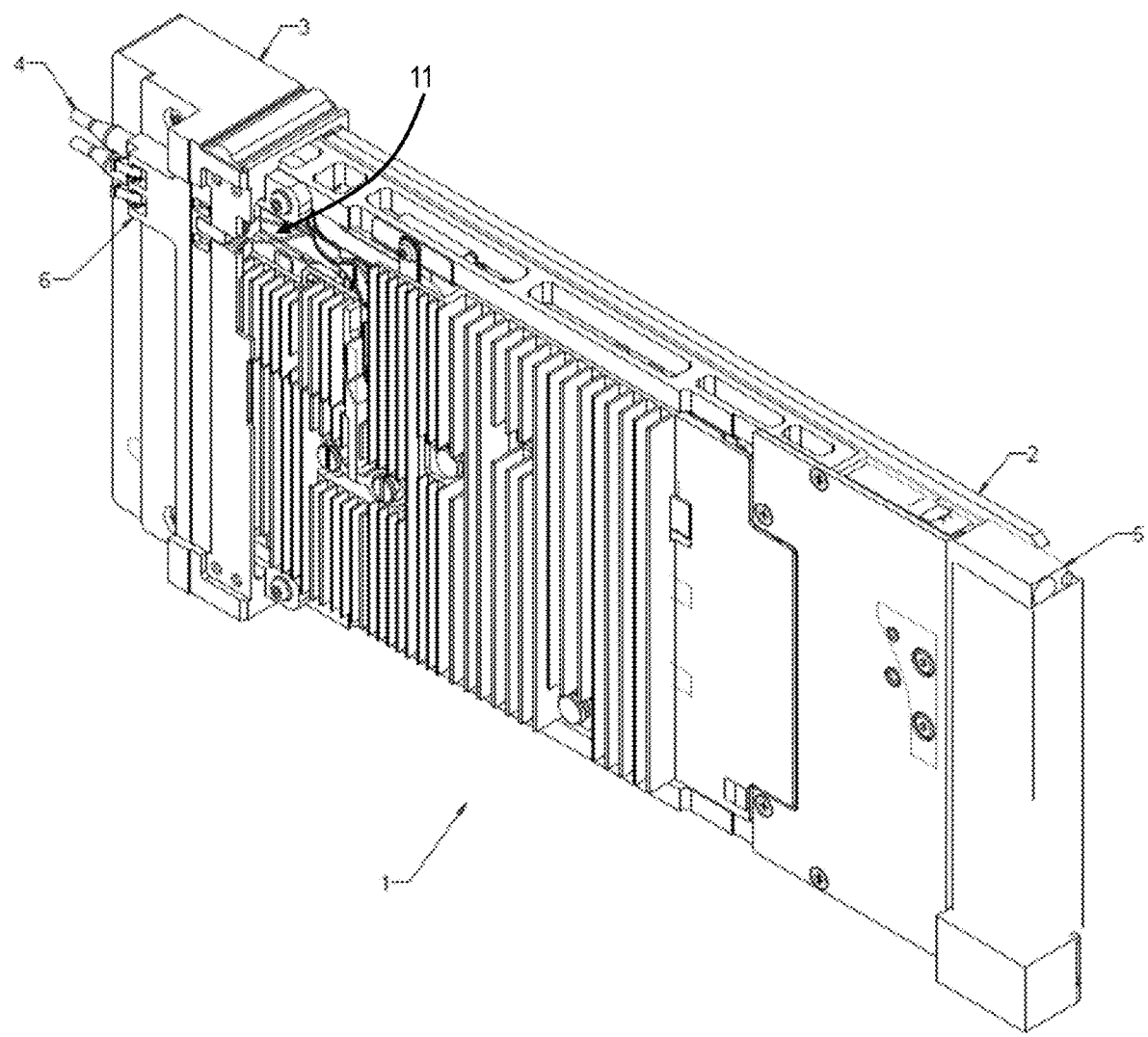
FIG. 1 is a perspective view of an exemplary embodiment of a networking module.

FIG. 1 is a perspective view of an exemplary embodiment of a networking module 1. The networking module 1 is an assembly, such as a circuit board assembly or circuit pack that includes an optical connection. The networking module 1 includes a Printed Circuit Board (PCB) 2, a faceplate assembly, electronics connected to the PCB (directly or indirectly), and a heat exchanger, such as a heat sink. While described as a networking module 1, the networking module 1 can be a circuit pack, module, line module, blade, etc. that is used in a telecommunications network element, a packet switch, a computing platform, a wireless network element, a storage network element, or the like.

The faceplate assembly is adapted to facilitate an optical connection to the networking module 1 via optical fiber connectors 4. In embodiments, the optical fiber connectors are one of LC connectors, SC connectors, and the like. The faceplate assembly includes a faceplate 3 and a SPOC 11. The faceplate 3 is positioned at an end of the networking module 1. The faceplate 3 includes a connector chassis 6 that is adapted to support the SPOC and to facilitate the connection between the optical fiber connectors 4 and the SPOC 11, where the connector chassis 6 and the SPOC 11 form a connector assembly. While a single connector assembly is shown in the embodiment of FIG. 1, in embodiments, the faceplate assembly includes multiple connector assemblies with multiple connector chassis 6 and multiple SPOCs 11. As is expected, having the SPOC 11 significantly less in size relative to the external optical fiber connectors 4 provides additional space or "real estate" in the networking module 1 for other components.

Figure 2:
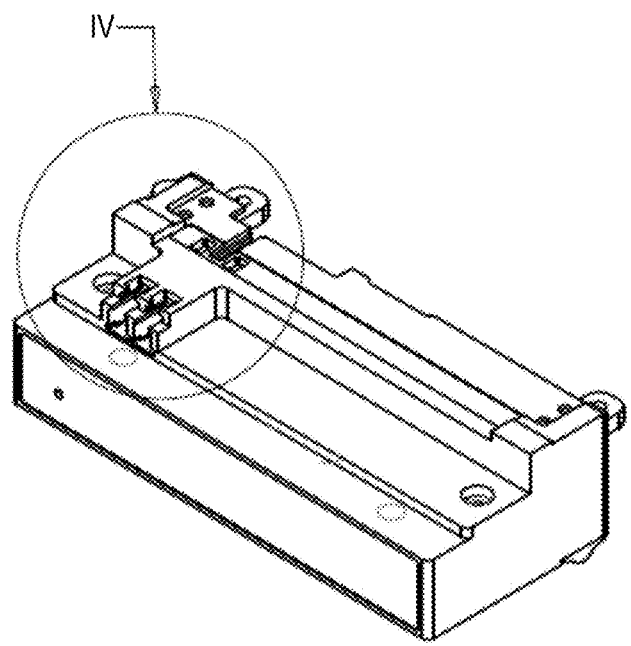
FIG. 2 is a perspective view of a faceplate of the networking module of FIG. 1.
Figure 3:
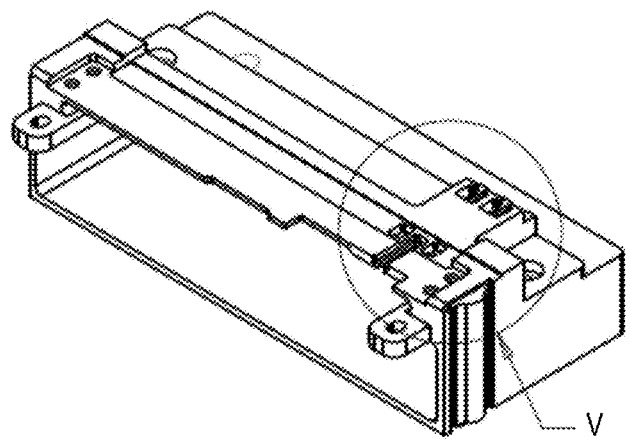
FIG. 3 is an alternate perspective view of the faceplate of FIG. 2.
Figure 4:
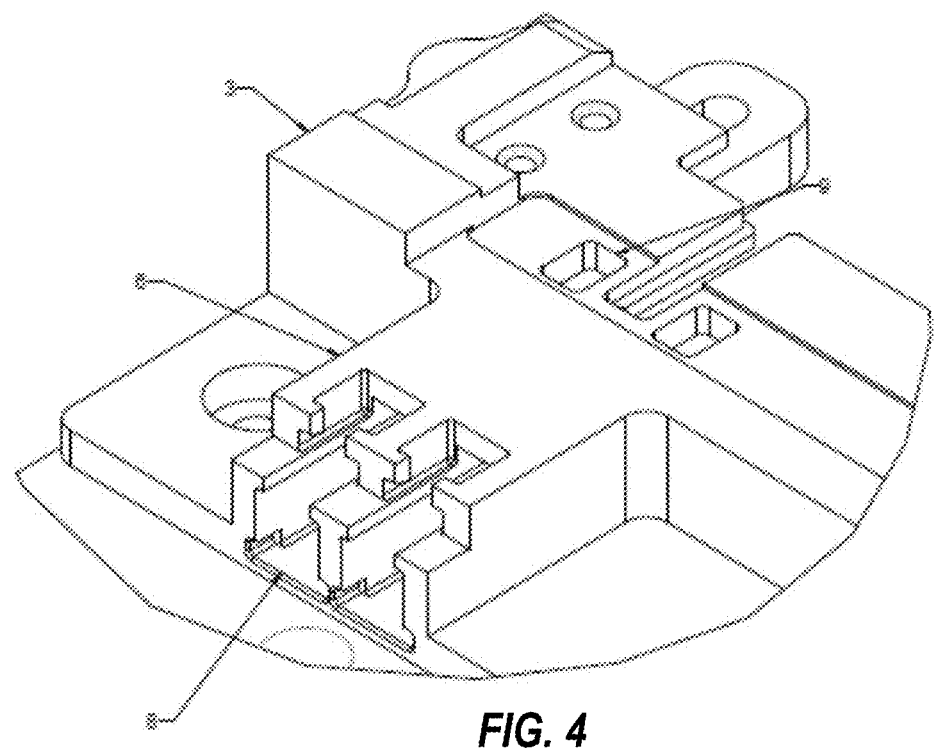
FIG. 4 is a detailed perspective view of a connector chassis of the faceplate of FIGS. 1-3, the view identified by IV in FIG. 2.
Figure 5:
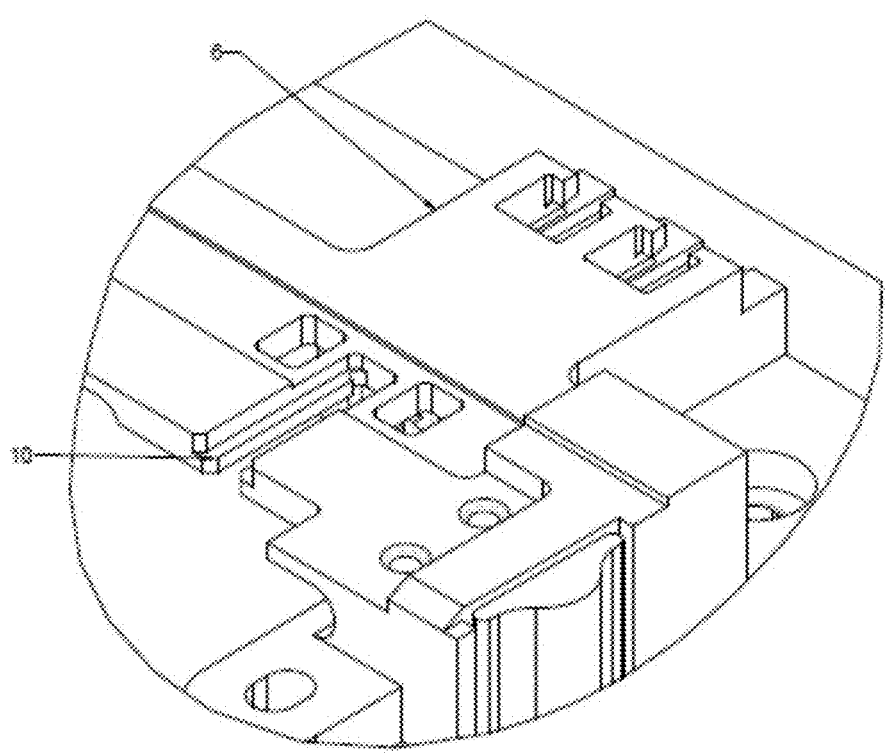
FIG. 5 is an alternate detailed perspective view of the connector chassis of FIG. 4, the view identified by V in FIG. 3.

FIG. 2 is a perspective view of the faceplate 3 of the networking module 1 of FIG. 1. FIG. 3 is an alternate perspective view of the faceplate 3 of FIG. 2. FIG. 4 is a detailed perspective view of the connector chassis 6 of the faceplate of FIGS. 1-3, the view identified by IV in FIG. 2. FIG. 5 is an alternate detailed perspective view of the connector chassis 6 of FIG. 4, the view identified by V in FIG. 3. Referring to FIGS. 2-5, the connector chassis 6 includes one or more cavities 8 adapted to receive the optical fiber connectors 4. The size and shape of the cavities 8 is based on the type of optical fiber connector 4 that the connector assembly is adapted to receive and interface with. In the embodiment illustrated, the cavities 8 are adapted to receive LC connectors.

While the connector chassis 6 protrudes from a body of the faceplate 3 in the embodiment illustrated, in other embodiments, the connector chassis 6 is flush with a body of the faceplate 3.

The faceplate 3 also includes a retention slot 10, which is formed in a body of the faceplate 3. The retention slot 10 is adapted to receive a portion of the SPOC 11 and is adapted to guide and hold the SPOC 11 in position relative to the faceplate 3. In the embodiment illustrated, the retention slot 10 is positioned opposite relative to the openings 8 and extends towards the openings 8 from the end of the faceplate 3 opposite the openings 8. In some embodiments, the retention slot 10 includes a recessed shelf around the perimeter thereof, the recessed shelf being positioned below a top surface of the faceplate 3 and adapted to provide support for the SPOC 11.

Figure 6:
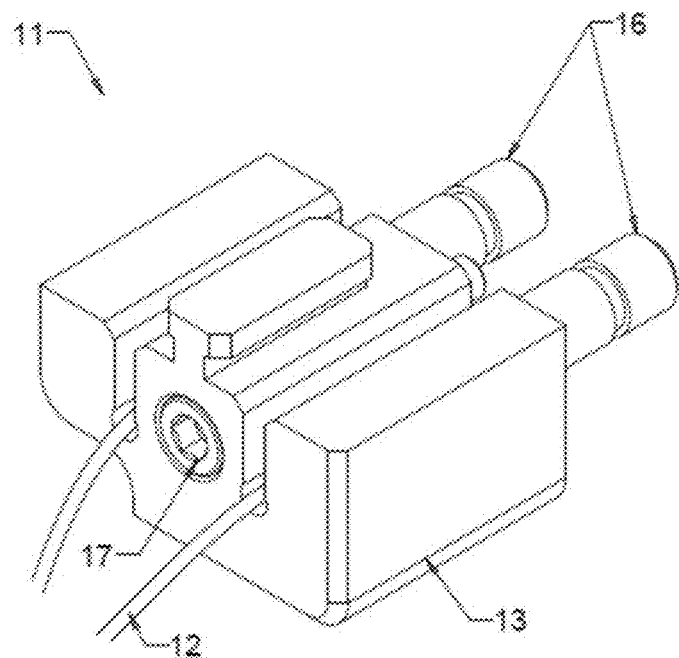
FIG. 6 is a perspective view of an embodiment of the shuttle pluggable optical connector of FIG. 1.
Figure 7:
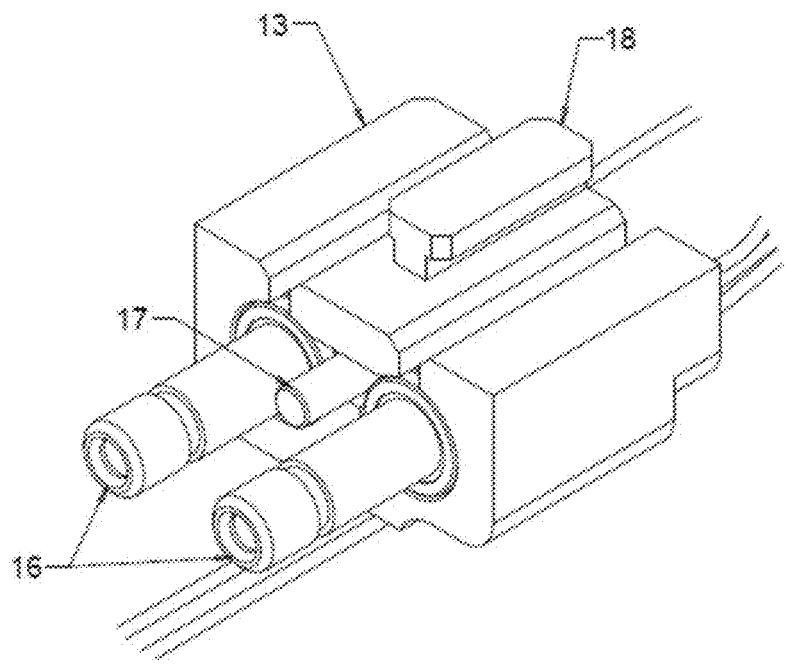
FIG. 7 is an alternate perspective view of the shuttle pluggable optical connector of FIG. 6.
Figure 8:
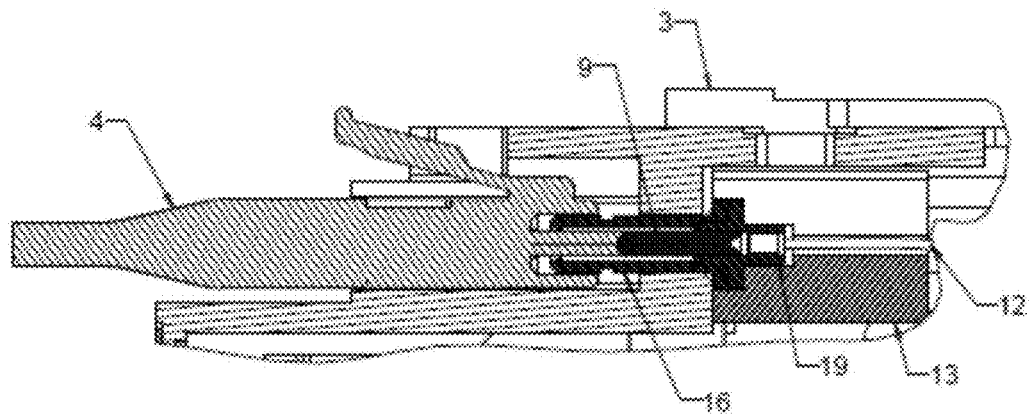
FIG. 8 is a cross-sectional view of the faceplate assembly of FIG. 1 including the faceplate and the shuttle pluggable optical connector of FIGS. 6 and 7.
Figure 9:
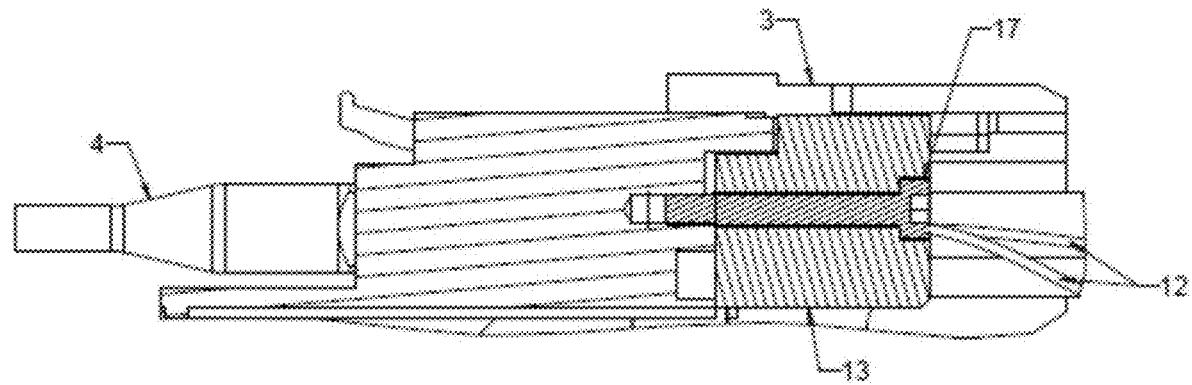
FIG. 9 is an alternate cross-sectional view of the faceplate assembly of FIG. 8.

FIG. 6 is a perspective view of an embodiment of the SPOC 11 of FIG. 1. FIG. 7 is an alternate perspective view of the SPOC 11A of FIG. 6. FIG. 8 is a cross-sectional view of the faceplate assembly of FIG. 1 including the faceplate 3 and the SPOC 11 of FIGS. 6 and 7. FIG. 9 is an alternate cross-sectional view of the faceplate assembly of FIG. 8. Referring to FIGS. 6-9, in embodiments, the SPOC 11 includes a shuttle body 13, one or more connection assemblies adapted to connect the optical fiber 12 with an optical fiber connector 4, and one or more retention features.

The shuttle body 13 is adapted to hold the one or more connection assemblies together. The shuttle body 13 includes a fiber slot for each of the one or more connection assemblies that is formed therein. In the embodiment illustrated, each fiber slot extends across the shuttle body 13 from one end to the other. The fiber slot is adapted for the optical fiber 12 to extend therethrough.

The shuttle body 13 also includes a bore for each of the one or more connection assemblies. The bore is blind hole that is aligned with the fiber slot with an end of the bore at least partially overlapped by the fiber slot. With this alignment an end of the respective connection assembly is exposed to the fiber slot while an end of the connection assembly is inserted in the bore which allows the optical fiber 12 to extend therefrom into the fiber slot. In the embodiment illustrated, the shuttle body 13 further includes a counter-bore at and concentric to each bore.

The shuttle body 13 also includes a guidance feature 18 adapted to mate with the retention slot 10. In the embodiment illustrated, the guidance feature 18 protrudes from a top surface of the shuttle body 13 and includes a 'T' shape. The 'T' shape includes a neck adapted to slide between the recessed shelves and a top with shoulders that are adapted to laterally overlap with the recessed shelves.

Each of the one or more connection assemblies includes a ferrule 16, a split sleeve 9, and a ferrule flange fiber termination 19. The ferrule 16 includes a housing that collinearly aligns the split sleeve 9 and the ferrule flange fiber termination 19 to provide a secure, robust, optical connection with minimal losses. In the embodiment illustrated, the housing includes a hollow cylindrical portion with an opening adapted to receive an optical connection portion of the optical fiber connector 4 and a flanged portion at an end of the hollow cylindrical portion opposite the opening. The housing forms a counterbore in the hollow cylinder shape opposite the opening and radially inward from the flange, the counterbore adapted to receive a portion of the ferrule flange termination to form a connection therewith.

The ferrule flange fiber termination 19 is adapted to mechanically terminate the optical fiber 12. The mechanical termination 19 interfaces with the ferrule 16 and is adapted to provide a collinear mechanical connection between the ferrule 16 and the optical fiber 12. The ferrule flange fiber termination 19 is spliced to an end of the optical fiber 12. In the embodiment illustrated, the ferrule flange fiber termination 19 includes a contact end, a flange, and a fiber connection end. The contact end includes a hollow cylinder shape that is adapted to fit within the counterbore of the housing and is adapted to receive the split sleeve 9. The flange is offset from an end of the hollow cylinder shape and abuts the flanged portion of the housing. The fiber connection end includes an optical contact portion that has an end exposed to the hollow cylinder shape of the contact end, the optical contact portion being spliced to the optical fiber 12.

The split sleeve 9 includes a first end adapted to be received within the contact end of the ferrule flange fiber termination 19 and a second end adapted to contact the optical connection portion of the optical fiber connector 4. In the embodiment illustrated, the split sleeve 9 is a ceramic component adapted to interface between an optical ceramic connector of the optical fiber connector 4, such as the optical ceramic connection on an end of an LC connector, and the mating optical fiber 12 entering the shuttle body 11 via the ferrule flange fiber termination 19.

The one or more retention features is adapted to secure the SPOC 11 to the faceplate 3, which ensures a secure, stable connection to the mating optical fiber connector(s) 4 connected to the exterior of the faceplate 3 at the cavities 8. In embodiments, the retention feature is also adapted to hold the SPOC 11 together.

Figure 10:
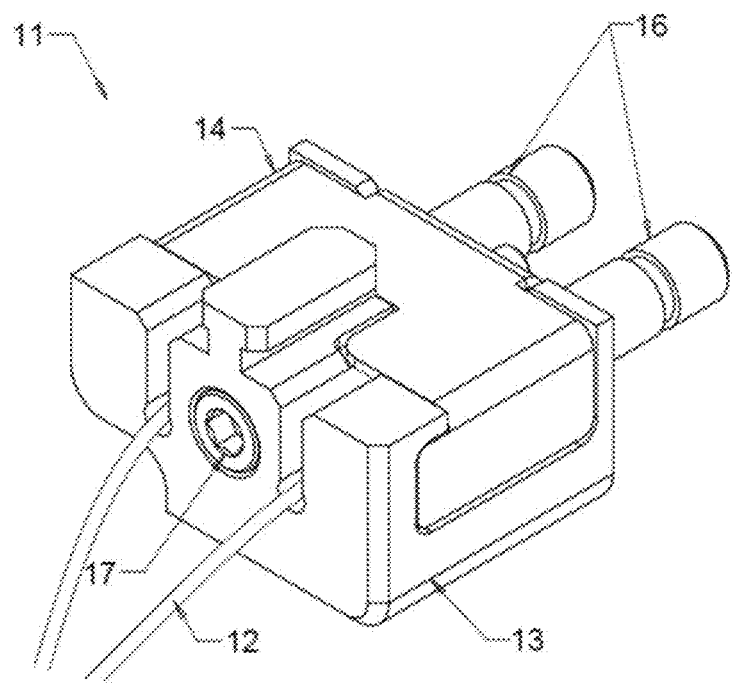
FIG. 10 is a perspective view of another embodiment of the shuttle pluggable optical connector of FIG. 1.
Figure 11:
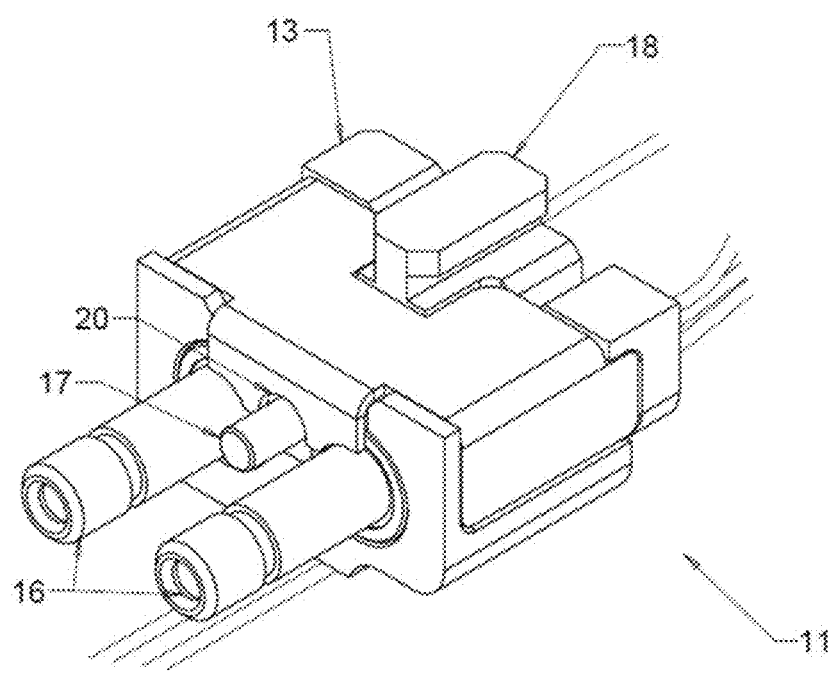
FIG. 11 is an alternate perspective view of the shuttle pluggable optical connector of FIG. 10.
Figure 12:
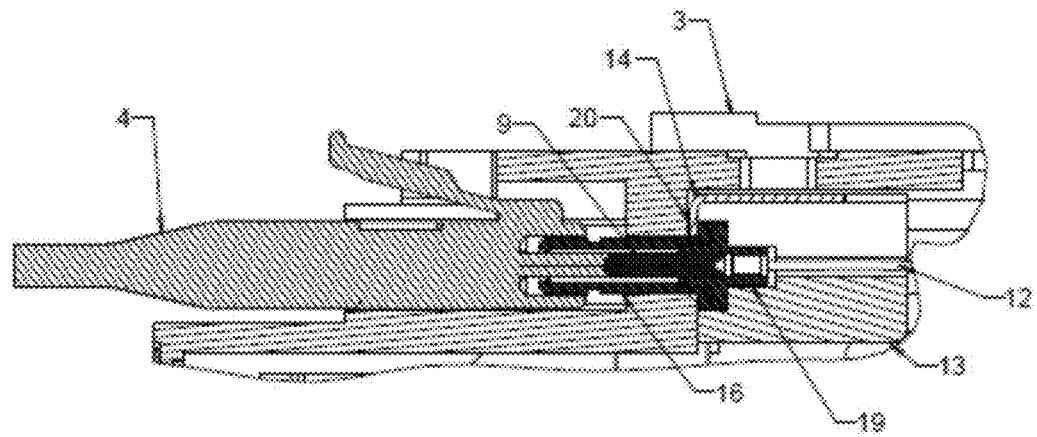
FIG. 12 is a cross-sectional view of the faceplate assembly of FIG. 1 including the faceplate and the shuttle pluggable optical connector of FIGS. 10 and 11.
Figure 13:
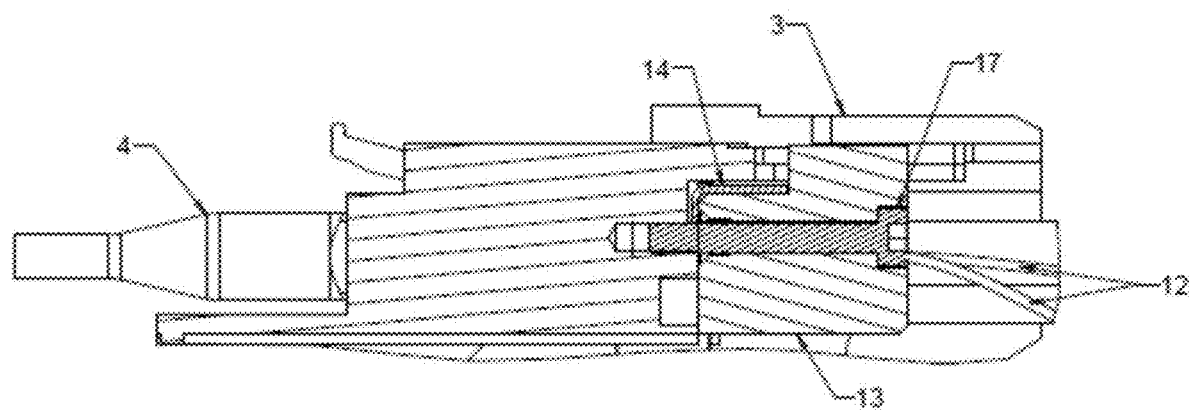
FIG. 13 is an alternate cross-sectional view of the faceplate assembly of FIG. 12.
Figure 14:
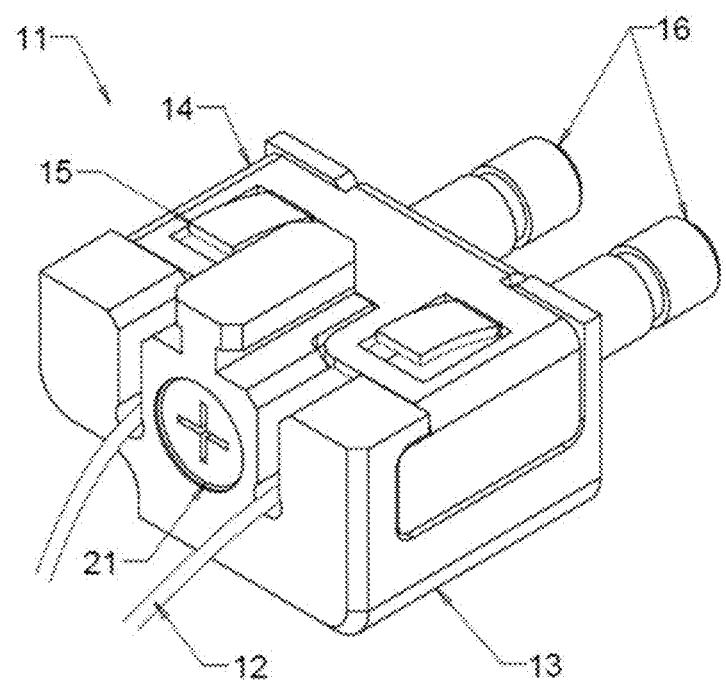
FIG. 14 is a perspective view of a further embodiment of the shuttle pluggable optical connector of FIG. 1.
Figure 15:
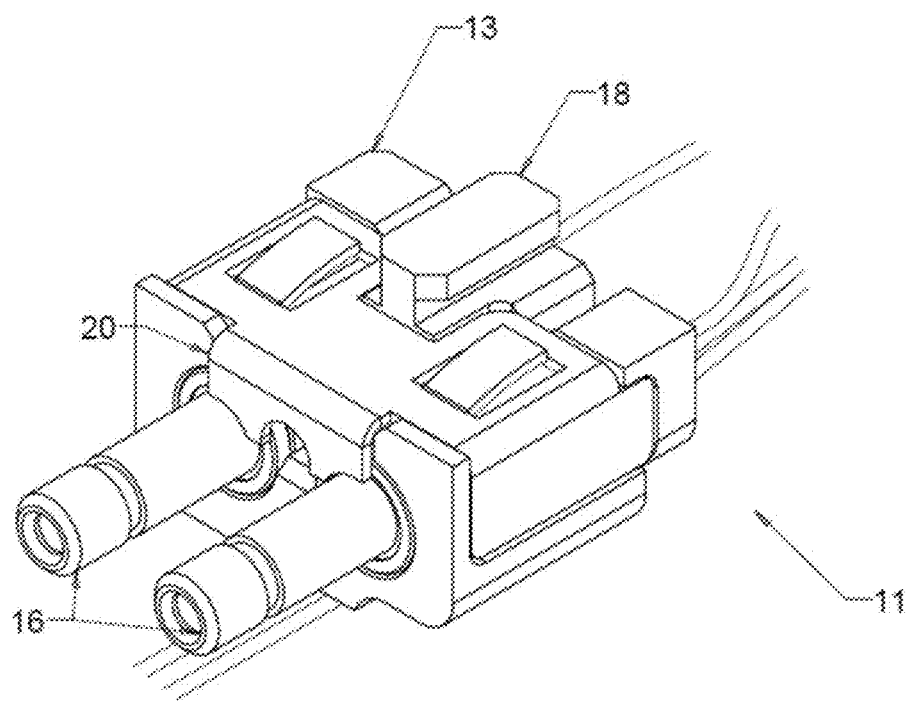
FIG. 15 is an alternate perspective view of the shuttle pluggable optical connector of FIG. 14.
Figure 16:
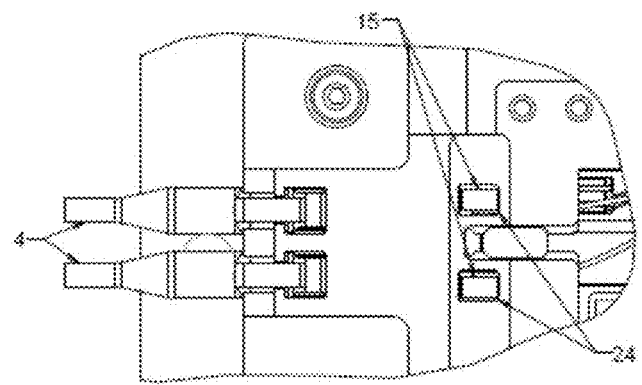
FIG. 16 is a top perspective view of the faceplate assembly of FIG. 1 including the faceplate and the shuttle pluggable optical connector of FIGS. 14 and 15.
Figure 17:
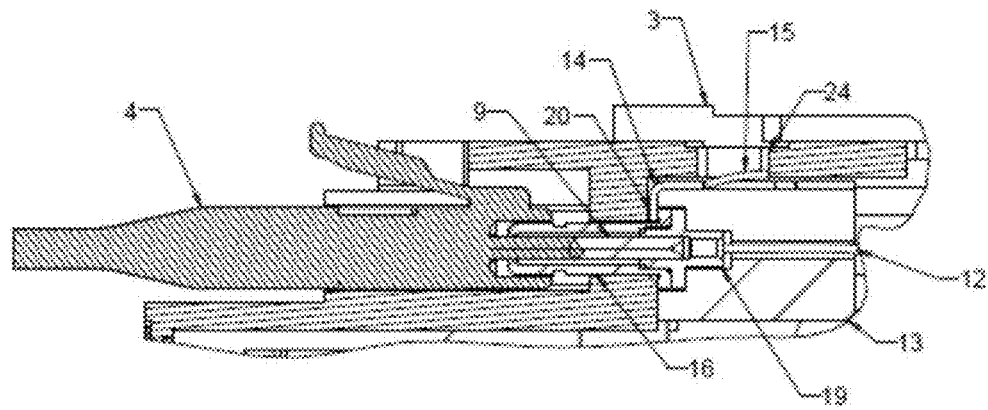
FIG. 17 is a cross-sectional view of the faceplate assembly of FIG. 16.
Figure 18:
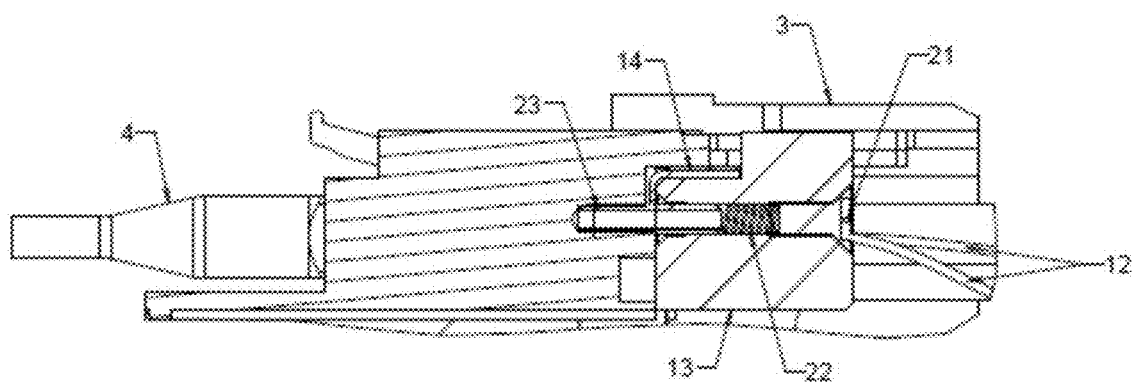
FIG. 18 is an alternate cross-sectional view of the faceplate assembly of FIGS. 16 and 17.
Figure 19:
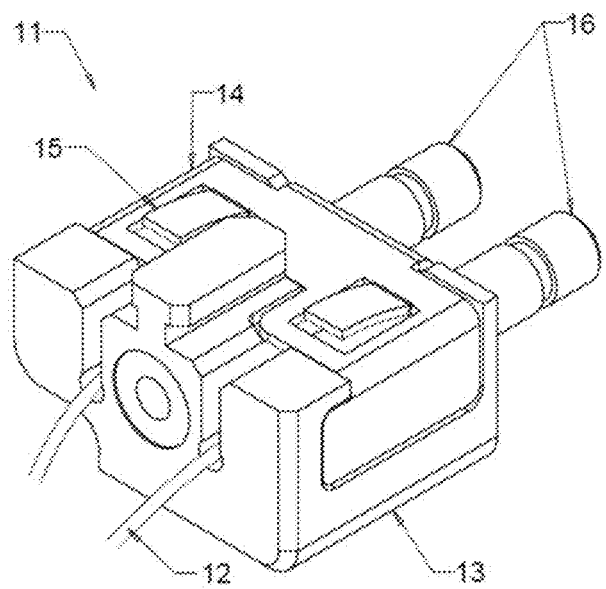
FIG. 19 is a perspective view of yet another embodiment of the shuttle pluggable optical connector of FIG. 1.
Figure 20:
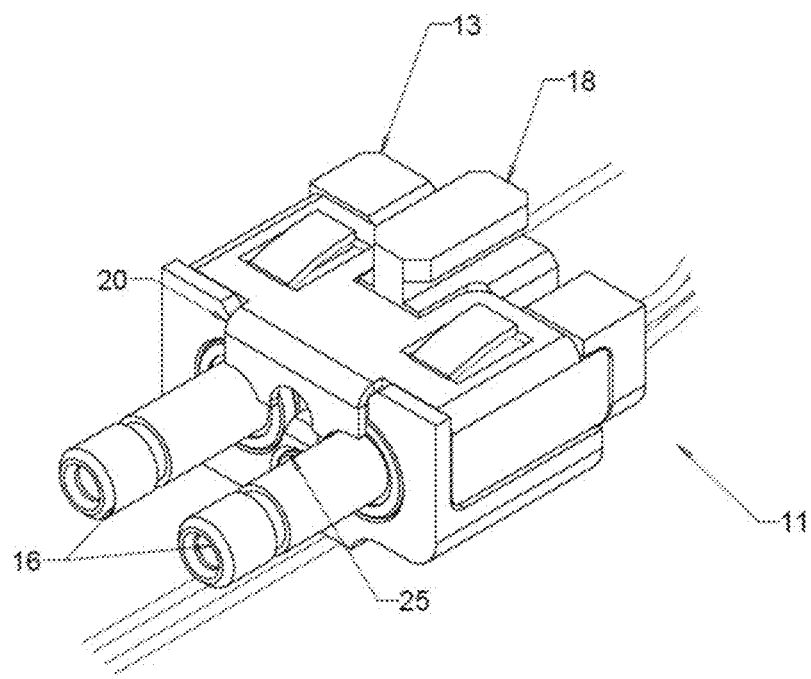
FIG. 20 is an alternate perspective view of the shuttle pluggable optical connector of FIG. 19.
Figure 21:
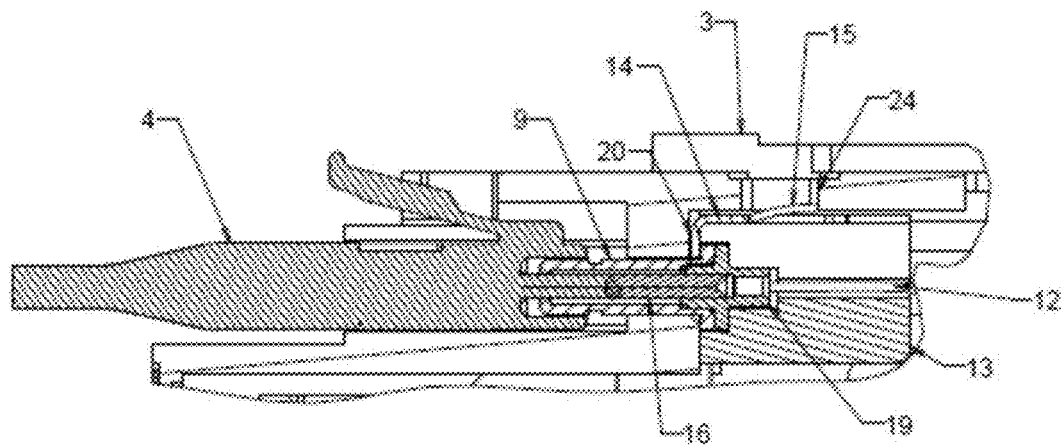
FIG. 21 is a cross-sectional view of the faceplate assembly of FIG. 1 including the faceplate and the shuttle pluggable optical connector of FIGS. 19 and 20.
Figure 22:
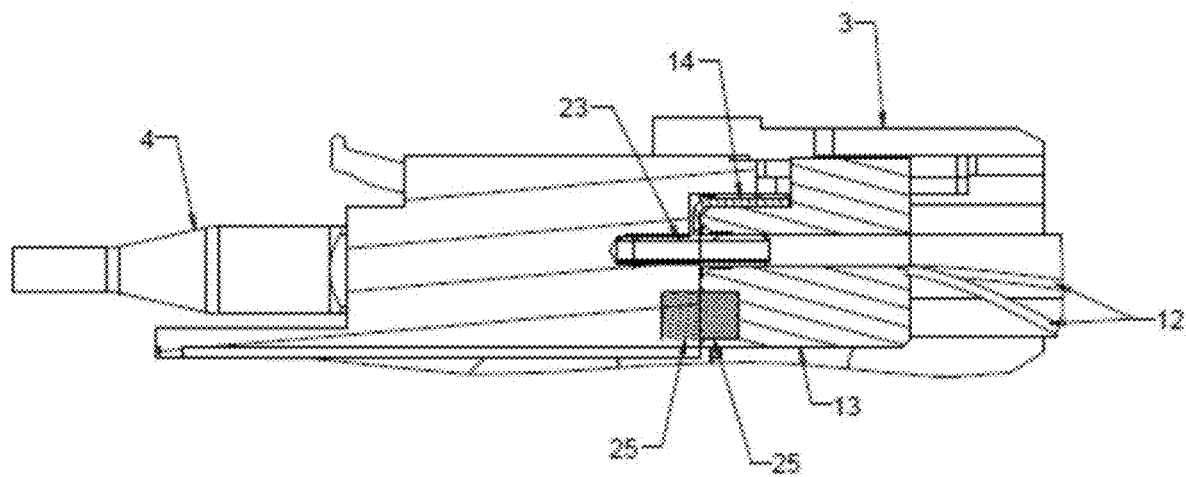
FIG. 22 is an alternate cross-sectional view of the faceplate assembly of FIG. 21.
Figure 23:
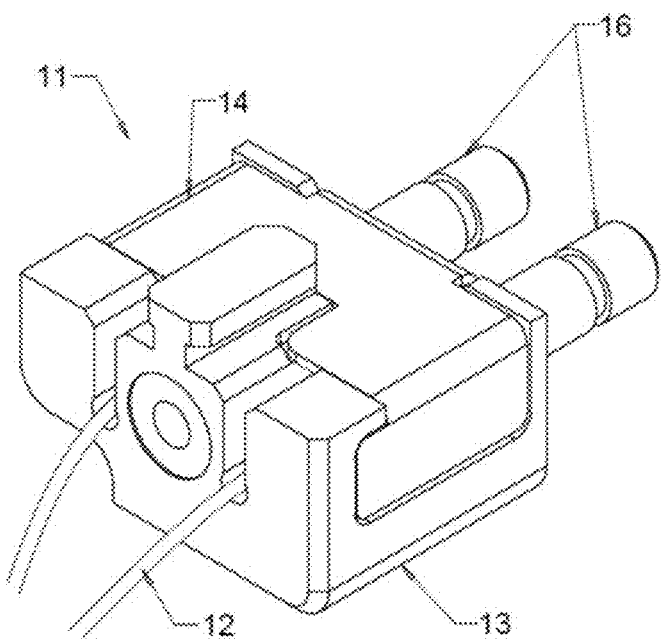
FIG. 23 is a perspective view of still a further embodiment of the shuttle pluggable optical connector of FIG. 1.
Figure 24:
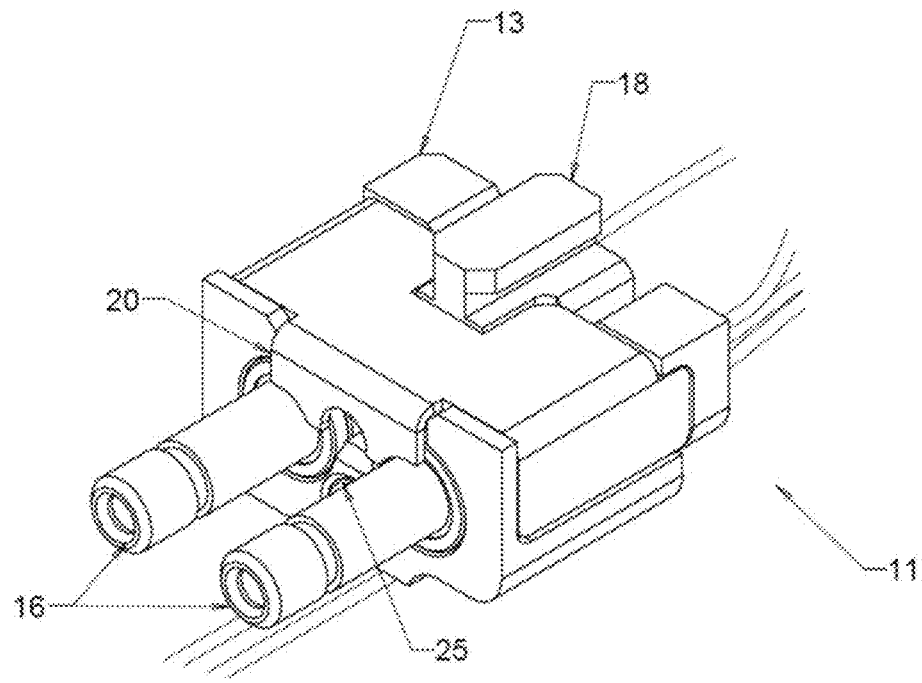
FIG. 24 is an alternate perspective view of the shuttle pluggable optical connector of FIG. 23.
Figure 25:
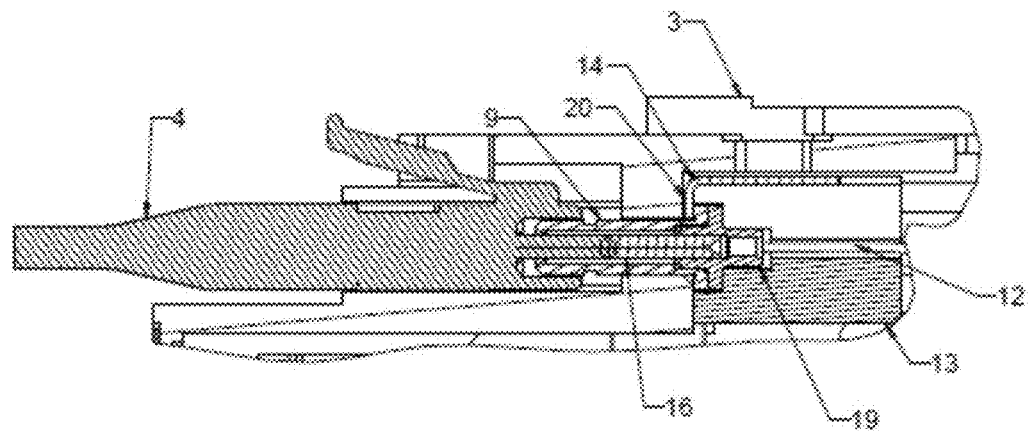
FIG. 25 is a cross-sectional view of the faceplate assembly of FIG. 1 including the faceplate and the shuttle pluggable optical connector of FIGS. 23 and 24.
Figure 26:
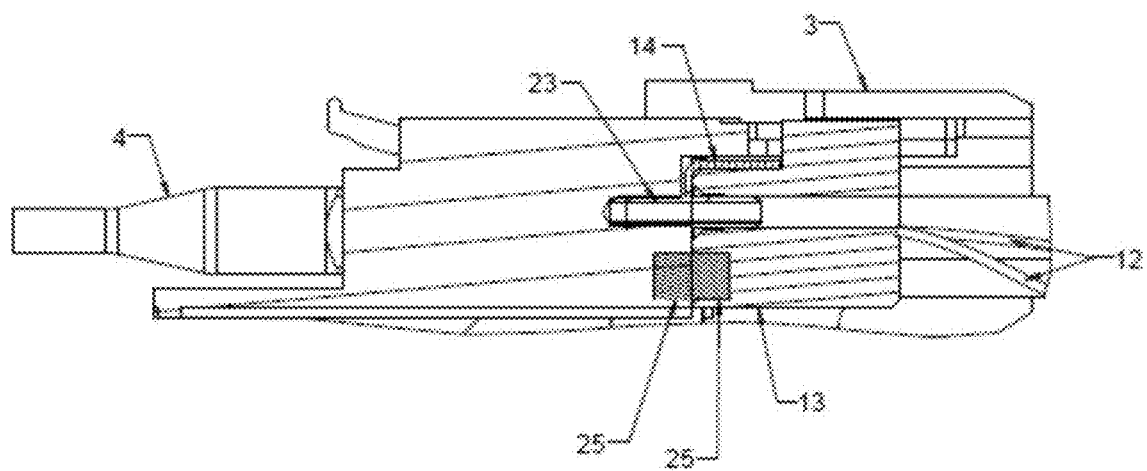
FIG. 26 is an alternate cross-sectional view of the faceplate assembly of FIG. 25.

FIG. 10 is a perspective view of another embodiment of the SPOC 11 of FIG. 1. FIG. 11 is an alternate perspective view of the SPOC 11 of FIG. 10. FIG. 12 is a cross-sectional view of the faceplate assembly of FIG. 1 including the faceplate and the SPOC 11 of FIGS. 10 and 11. FIG. 13 is an alternate cross-sectional view of the faceplate assembly of FIG. 12. FIG. 14 is a perspective view of a further embodiment of the SPOC 11 of FIG. 1. FIG. 15 is an alternate perspective view of the SPOC 11 of FIG. 14. FIG. 16 is a top perspective view of the faceplate assembly of FIG. 1 including the faceplate and the SPOC 11 of FIGS. 14 and 15. FIG. 17 is a cross-sectional view of the faceplate assembly of FIG. 16. FIG. 18 is an alternate cross-sectional view of the faceplate assembly of FIGS. 16 and 17. FIG. 19 is a perspective view of yet another embodiment of the SPOC 11 of FIG. 1. FIG. 20 is an alternate perspective view of the SPOC 11 of FIG. 19. FIG. 21 is a cross-sectional view of the faceplate assembly of FIG. 1 including the faceplate and the SPOC 11 of FIGS. 19 and 20. FIG. 22 is an alternate cross-sectional view of the faceplate assembly of FIG. 21. FIG. 23 is a perspective view of still a further embodiment of the SPOC 11 of FIG. 1. FIG. 24 is an alternate perspective view of the SPOC 11 of FIG. 23. FIG. 25 is a cross-sectional view of the faceplate assembly of FIG. 1 including the faceplate and the SPOC 11 of FIGS. 23 and 24. FIG. 26 is an alternate cross-sectional view of the faceplate assembly of FIG. 25.

Referring to FIGS. 6-25, the one or more retention features includes one or more of a threaded fastener 17, such as a screw or a bolt, snap features 15, a guide pin 21, a securing fastener 23, and a magnets 25. In the embodiments of FIGS. 6-13, the shuttle body 13 includes a threaded fastener bore adapted to receive an intermediate portion (non-threaded) of the threaded fastener 17 and a threaded fastener counterbore adapted to receive a head of the threaded fastener 17, the threaded fastener counterbore being positioned on an end opposite an of the shuttle body 13 that contacts the faceplate 3. The faceplate 3 includes a threaded hole for receiving the threaded end of the threaded fastener 17.

In the embodiment of FIGS. 14-18, the SPOC 13 is secured to the faceplate 3 using a combination of the snap features 15, the guide pin 23, a spring 22, and the securing fastener 21. Referring to FIGS. 14-16, the snap features 15 are positioned at a top of the shuttle body 13 and are adapted to mate with snap holes 24 in a top portion of the faceplate 3. In the embodiment illustrated, the snap features 15 are adapted to protrude from the top of the shuttle body 13 and protrude into the snap holes 24. Referring to FIG. 18, the faceplate 3 includes a blind hole adapted to receive an end of the guide pin 23. The shuttle body 11 includes a bore adapted to receive the opposing end of the guide pin 23 and the spring 22. The bore is also adapted to receive the securing fastener 21 and includes threading adjacent to a position of the spring 22. In embodiments, the securing fastener 21 is received in a counterbore with threading at least at an end thereof. The securing fastener 21 is adapted to secure the spring 22 within the bore between the guide pin 23 and the securing fastener 21.

In the embodiments illustrated in FIGS. 19-26, the SPOC 11 is secured to the faceplate 3 via a magnets 25 and the snap features 15. One or more magnets 15 are positioned in each of adjoining surfaces of the faceplate 3 and the shuttle body 13. The magnets 15 in opposing surfaces are adapted to hold the SPOC 11 flush with the faceplate 3 ensuring that the connection between the SPOC 11 and the faceplate 3 is solid. With the use of magnets, the SPOC 11 can be assembled to the faceplate 3 without tools. In the embodiment illustrated, a guide pin 23 is also used to ensure alignment of the SPOC 11 with the faceplate 3 while the SPOC 11 is held in place relative to the faceplate 3 by the magnets 25.

In the embodiment illustrated, in FIGS. 19-22 the SPOC 11 is further secured to the faceplate 3 using the snap features 3.

While some combinations of the one or more retention features are shown in FIGS. 6-25, other combinations are also contemplated, such as combinations of a threaded fastener 17, a magnet 17, and the snap features 15.

Referring to FIGS. 10-26, in some embodiments, the SPOC 11 includes a retention clip 14. The retention clip 14 is adapted to secure the one or more connection assemblies in place relative to the shuttle body 11. In embodiments, the retention clip 11 includes a retention portion that overlaps with the flanged portion of the ferrule 16 ensuring that the flanged portion of the ferrule 16 remains within the counterbore of the shuttle body 11. In the embodiment illustrated, the retention clip 11 includes a body that is adapted to be received within a recess in the shuttle body 11 and the retention portion extends therefrom. In some embodiments, the retention clip 11 includes a U-shape that fits into a recess formed in the top and sides of the shuttle body 11 and the sides of the U-shape include tabs that extend into retention recesses formed in the shuttle body 11 that are adapted to secure the retention clip 14 to the shuttle body 11. With the retention clip 14, the SPOC 11, including the shuttle body 11, the ferule 16, the split sleeve 9, and the ferrule flange fiber termination 19, to be pre-assembled prior to being assembled with the faceplate 3. In embodiments, this pre-assembly includes the optical fiber 12.

The SPOC 11 significantly reduces the physical space required to interface with the faceplate 3 as compared to standard optical connectors, such as LC connectors, which frees up that space for other critical components within the module 1.

Again, the SPOC 11 is merely referred to herein as a "shuttle" pluggable optical connector (SPOC), and those skilled in the art will appreciate it may be referred to with different terminology. The SPOC 11 is designed to significantly reduce the space required to interface with faceplate 3 LC optical connectors 4 to free up physical space within the module 1 to be used by other more critical components. This improves design efficiency and makes designs possible within a certain volume that were previously not possible.

Figure 27:
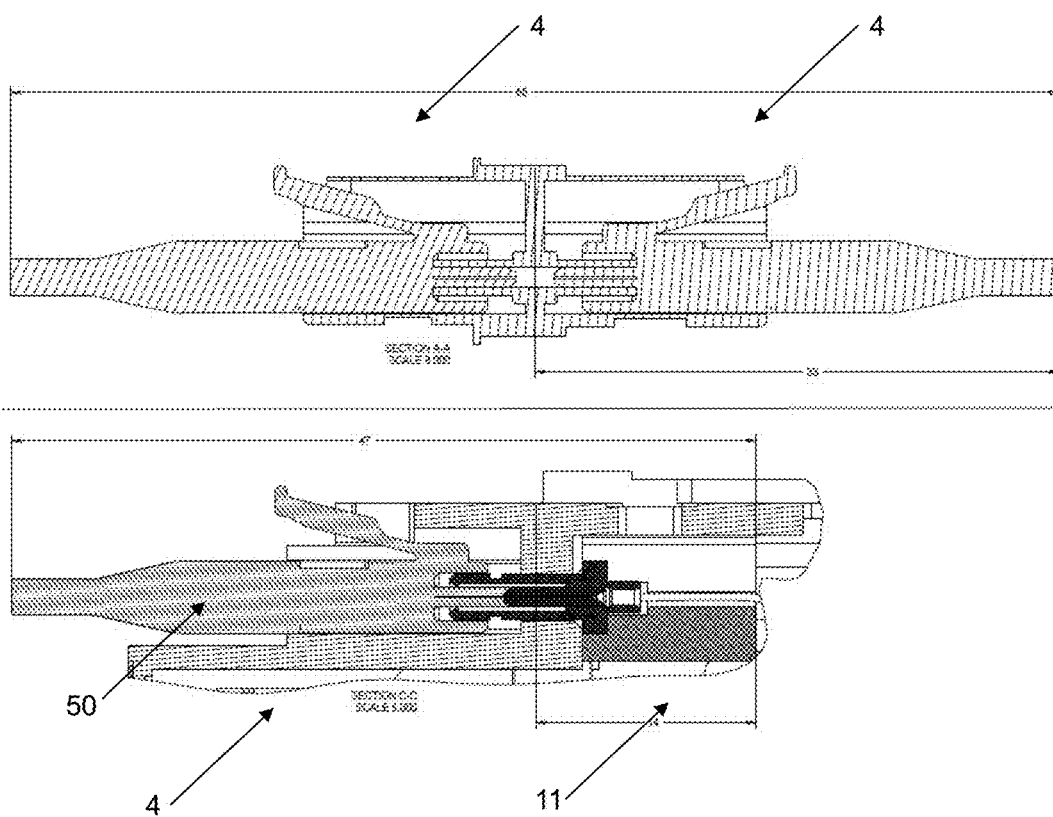
FIG. 27 is a cross-sectional view illustrating two LC optical fiber connectors (top view) connected to one another compared to an external LC optical fiber connector connected to the shuttle pluggable optical connector of FIG. 1 (bottom view)

FIG. 27 is a cross-sectional view illustrating two LC optical fiber connectors 4 (top view) connected to one another compared to an external LC optical fiber connector 4 connected to the SPOC 11 (bottom view). Specifically, in both the top and bottom view in FIG. 27, the connectors on the right side are internal to the networking module 1 whereas the connectors on the left side are external. This illustrates the relative size savings using the new SPOC 11 design. In an embodiment, the SPOC 11 design takes up 70% of the overall length (30% reduction) of a typical fully mated duplex LC connector configuration. The new SPOC 11 design takes up 43% of the overall length (57% reduction) of a typical fully mated duplex LC connector configuration when considering the space inside a module's 1 faceplate 3.

The reduction in the size of the SPOC 11 is based on not requiring a strain relief boot 50 on the fiber inside the module 1. The LC connectors 4 are robust but are designed in such a way as to add some sort of strain relief functionality where the fiber exits the LC body as these are connectors meant to be interfaced (physically handled) by a user. The SPOC 11 simplifies the requirement by removing such a need because the fiber connection is made only during assembly and exists within a finished networking module 1. Once the fiber connection assembled, it does not need to be disassembled or handled in any way, at least outside of a manufacturing environment, which negates the need for strain relief. This greatly simplifies the design and reduces size as shown herein. In addition to this, since it is not meant as a customer facing connector it can be again reduced in size which makes handling more difficult but is also much less of a requirement in a manufacturing environment where this connector is used.

Figure 28:
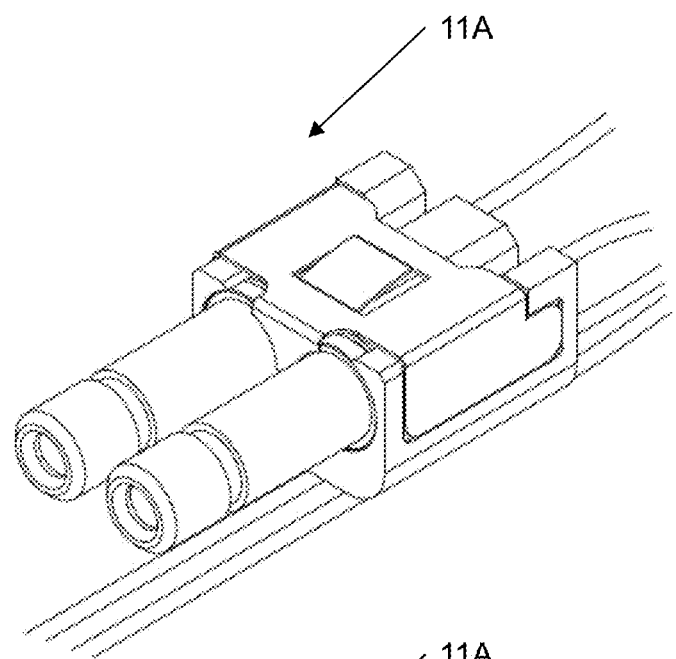
FIG. 28 is a perspective view of yet another embodiment of the shuttle pluggable optical connector of FIG. 1 for use with a CS connector.
Figure 29:
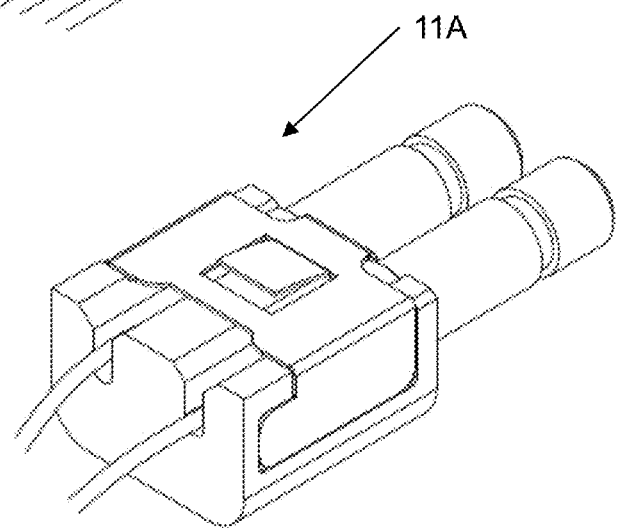
FIG. 29 is an alternate perspective view of the shuttle pluggable optical connector of FIG. 28.
Figure 30:
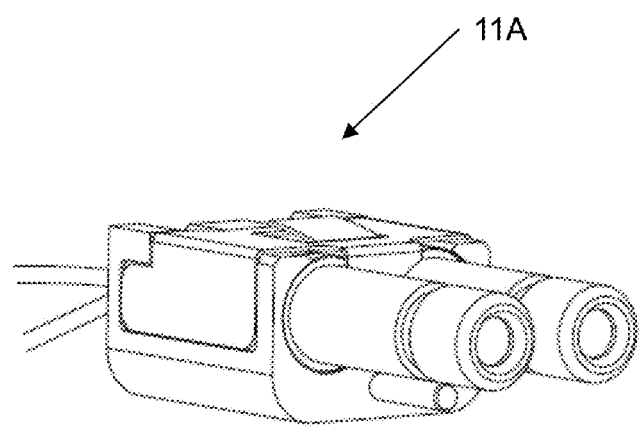
FIG. 30 is yet another alternate perspective view of the shuttle pluggable optical connector of FIG. 28.

The foregoing description referenced the LC connectors 4 for illustration purposes. Those skilled in the art will recognize the SPOC 11 can operate with other types of external optical connectors besides the LC connectors 4. FIGS. 28-30 illustrate an example SPOC 11A for use with CS connectors (not shown). For example, CS connectors are compact, duplex connectors, i.e., smaller than the LC connectors 4. The SPOC 11A includes similar components as the SPOC 11 but is illustrated to show the form factor for use with CS connectors. Again, those skilled in the art will recognize the SPOC 11, 11A can be used with any type of external connector, with the SPOC 11, 11A having a reduced profile as described herein.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. An optical fiber connector for internal connectivity to a faceplate assembly of a networking module, the optical fiber connector comprising:
   a shuttle body including a fiber slot extending across the shuttle body and adapted for an optical fiber to extend therethrough;
   a connection assembly adapted to connect the optical fiber of the networking module to an external optical fiber connector, the connection assembly including
      a ferrule flange fiber termination positioned within the shuttle body and adapted to splice to an end of the optical fiber,
      a split sleeve adapted to optically connect the ferrule flange fiber termination to the external optical fiber connector, and
      a ferrule adapted to collinearly align the external optical fiber connector, the split sleeve, and the ferrule flange fiber termination; and
   a retention clip adapted to secure the connection assembly in place relative to the shuttle body.

2. The optical fiber connector of claim 1, wherein the shuttle body includes a bore aligned with the fiber slot with an end thereof at least partially overlapped with the fiber slot and adapted to at least partially receive the ferrule flange fiber termination therein, such that the optical fiber spliced thereto extends from the ferrule flange fiber termination into the fiber slot.

3. The optical fiber connector of claim 2, wherein the shuttle body includes a counterbore concentric to the bore and the ferrule includes a flange adapted to be received into the counterbore.

4. The optical fiber connector of claim 1, wherein a length of the optical fiber connector is less than half a length of the external optical fiber connector.

5. The optical fiber connector of claim 1, further comprising one or more retention features including at least one of a threaded fastener adapted to extend through the shuttle body, a magnet adapted to mate with a magnet in a faceplate of the faceplate assembly, a guide pin adapted to align the shuttle body with the faceplate, and a snap feature adapted to mate with a snap hole formed in the faceplate.

6. The optical fiber connector of claim 1, wherein the shuttle body includes a guidance feature protruding from a top thereof, the guidance feature adapted to mate with a retention slot formed in a faceplate of the faceplate assembly.

7. The optical fiber connector of claim 6, wherein the guidance feature includes a 'T' shape, the 'T' shape including a neck adapted to slide between recessed shelves of the faceplate and shoulders adapted to laterally overlap with the recessed shelves.

8. A faceplate assembly located internally in a networking module, comprising:
   a faceplate; and
   an optical fiber connector comprising
      a shuttle body including a fiber slot extending across the shuttle body and adapted for an optical fiber to extend therethrough,
      a connection assembly adapted to connect the optical fiber of the networking module to an external optical fiber connector, the connection assembly including a ferrule flange fiber termination positioned within the shuttle body and adapted to splice to an end of the optical fiber, a split sleeve adapted to optically connect the ferrule flange fiber termination to the external optical fiber connector, and a ferrule adapted to collinearly align the external optical fiber connector, the split sleeve, and the ferrule flange fiber termination, and
      the optical fiber connector further including a retention clip adapted to secure the connection assembly in place relative to the shuttle body.

9. The faceplate assembly of claim 8, wherein the shuttle body includes a bore aligned with the fiber slot with an end thereof at least partially overlapped with the fiber slot and adapted to at least partially receive the ferrule flange fiber termination therein, such that the optical fiber spliced thereto extends from the ferrule flange fiber termination into the fiber slot.

10. The faceplate assembly of claim 9, wherein the shuttle body includes a counterbore concentric to the bore and the ferrule includes a flange adapted to be received into the counterbore.

11. The faceplate assembly of claim 10, wherein the retention clip includes a retention portion that overlaps with the flanged portion of the ferrule to secure the flanged portion within the counterbore.

12. The faceplate assembly of claim 8, further comprising one or more retention features including at least one of a threaded fastener adapted to extend through the shuttle body, a pair of magnets including one magnet in the shuttle body and one magnet in the faceplate adapted to hold the shuttle body in contact with the faceplate, a guide pin adapted to align the shuttle body with the faceplate, and a snap mechanism including a snap hole formed in the faceplate and a snap feature that protrudes from a surface of the shuttle body and is adapted to mate with the snap hole.

13. The faceplate assembly of claim 8, wherein the faceplate includes a retention slot and the optical fiber connector includes a guidance feature protruding from a top thereof, the guidance feature adapted to mate with a retention slot formed in a faceplate of the faceplate assembly.

14. The faceplate assembly of claim 13, wherein the faceplate includes recessed shelves along the retention slot and the guidance feature includes a 'T' shape, the 'T' shape including a neck adapted to slide between the recessed shelves and shoulders adapted to laterally overlap with the recessed shelves.

15. A networking module, comprising:
   a Printed Circuit Board (PCB);
   a faceplate connected to the PCB; and
   an optical fiber connector located internally in the networking module and comprising
      an optical fiber connected to the PCB,
      a shuttle body including a fiber slot extending across the shuttle body with the optical fiber extending therethrough,
      a connection assembly adapted to connect the optical fiber to an external optical fiber connector, the connection assembly including a ferrule flange fiber termination positioned within the shuttle body spliced to an end of the optical fiber, a split sleeve adapted to optically connect the ferrule flange fiber termination to the external optical fiber connector, and a ferrule adapted to collinearly align the external optical fiber connector, the split sleeve, and the ferrule flange fiber termination, and
      the optical fiber connector further including a retention clip securing the connection assembly in place relative to the shuttle body.

16. The networking module of claim 15, wherein the shuttle body includes a bore aligned with the fiber slot with an end thereof at least partially overlapped with the fiber slot and adapted to at least partially receive the ferrule flange fiber termination therein, such that the optical fiber spliced thereto extends from the ferrule flange fiber termination into the fiber slot.

17. The networking module of claim 16, wherein the shuttle body includes a counterbore concentric to the bore and the ferrule includes a flange adapted to be received into the counterbore.

18. The networking module of claim 17, wherein the retention clip includes a retention portion that overlaps with the flanged portion of the ferrule to secure the flanged portion within the counterbore.

19. The networking module of claim 15, wherein further comprising one or more retention features including at least one of a threaded fastener adapted to extend through the shuttle body, a pair of magnets including one magnet in the shuttle body and one magnet in the faceplate adapted to hold the shuttle body in contact with the faceplate, a guide pin adapted to align the shuttle body with the faceplate, and a snap mechanism including a snap hole formed in the faceplate and a snap feature that protrudes from a surface of the shuttle body and is adapted to mate with the snap hole.

20. The networking module of claim 15, wherein the faceplate includes a retention slot and the optical fiber connector includes a guidance feature protruding from a top thereof, the guidance feature adapted to mate with a retention slot formed in a faceplate of the faceplate assembly.

* * * * *